Feb. 7, 1956    F. F. KISHLINE ET AL    2,733,933
VEHICLE FRAME CROSS MEMBER

Original Filed April 24, 1946    2 Sheets-Sheet 1

FLOYD F. KISHLINE
ROSS H. PHELPS
JOHNSTON STUART VOIGT
INVENTORS

BY Carl J. Barber
ATTORNEY

FLOYD F. KISHLINE
ROSS H. PHELPS
JOHNSTON STUART VOIGT
INVENTORS

BY Carl J. Barbee
ATTORNEY

United States Patent Office 2,733,933
Patented Feb. 7, 1956

2,733,933

VEHICLE FRAME CROSS MEMBER

Floyd F. Kishline, Ross H. Phelps, and Johnston Stuart Voigt, Kenosha, Wis., assignors to American Motors Corporation, a corporation of Maryland Original application April 24, 1946, Serial No. 664,632, now Patent No. 2,611,625, dated September 23, 1952. Divided and this application August 18, 1952, Serial No. 304,956

2 Claims. (Cl. 280—106)

This invention relates to certain improvements in vehicle frame cross members, and the nature and objects of the invention will be readily recognized by those skilled in the art in the light of the following explanation and detailed description of the accompanying drawings illustrating what we at present consider to be the preferred embodiments and mechanical expressions of our invention from among various other embodiments, adaptations, forms, arrangements and combinations of which the invention is capable within the broad spirit and scope thereof.

This application is filed as a division of our copending parent application filed April 24, 1946, Serial No. 664,632, for "Independent Front Wheel Suspension Coupled As a Unit to the Vehicle Frame," Patent No. 2,611,625, issued, September 23, 1952.

This invention is primarily concerned with an independent front wheel suspension for automobiles and the like, generally characterized by a completely preassembled and adjusted structure for mounting in a vehicle.

It is a general object of our invention to improve the over-all suspension system and it is particularly directed to the frame cross member associated with said suspension system.

It is a more specific object to provide an improved frame cross member for vehicles having a flanged channel member and strengthening members associated with said channel member.

With the foregoing and certain other objects in view which will be readily apparent from the following detailed description, our invention consists in certain novel features in design and construction of parts and in certain novel combinations and arrangements thereof, all as will be more specifically referred to and explained hereinafter.

In the drawings, of which there are two sheets, and in which the same numbers are used to indicate like members:

Figure 1:
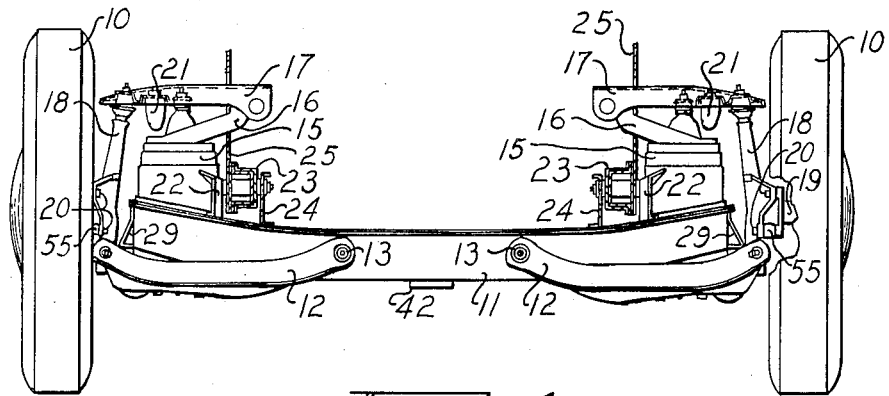
Figure 1 is a front elevational view of the invention as applied to the front wheels of an automobile.

Referring in detail to the drawings, a rigid cross member 11 is illustrated in Figure 1, as embodying and including a form and construction of our invention, adapted for application to both of the front wheels 10 of an automobile.

This member 11 extends between the front wheels and rotatively mounts lower control arms 12. The control arms 12 are secured at their inner ends to cross member 11 by bolts 13.

Cross member 11 is provided with a pair of towers 15 on the top of which are secured upper-control-arm-carrying members 16. Members 16 carry the upper control arms 17, the inner ends of which are rotatably secured to the members 16.

Wheel carrying pins 18 are positioned between the outer ends of lower control arms 12 and upper control arms 17 and are rotatably secured to the upper arms 17, and are rotatably secured to the lower control arms 12 by trunnion connections.

Rubber bumpers 21 are secured to upper control arms 17 which strike members 16 when the wheels 10 are lowered excessively.

Sheet metal stampings 22 are secured to the top of cross member 11 to brace towers 15 and also aid in securing the cross member 11 to the side rails 23 of the automobile frame. Stampings 24 are secured to the top of cross member 11 and are spaced from stampings 22 to a distance sufficient to permit side rails 23 of the frame to be placed therebetween. Wheel housings 25 extend downwardly and are secured to rails 23 between said rails and stampings 22.

Figure 4:
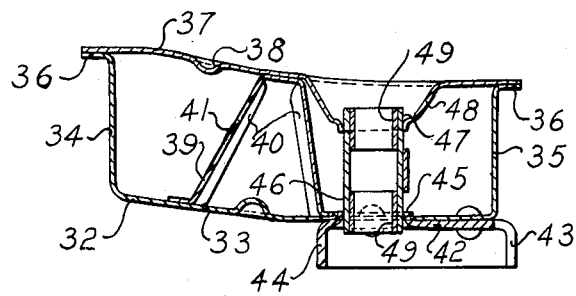
Figure 4 is a sectional view taken along the lines 4—4 of Figure 3 and facing in the direction of the arrows.

Cross member 11 is composed of a channel member (Figure 4) having an under portion 33, a substantially vertical front wall 34, a vertical rear wall 35 and a horizontal flange 36 extending around the entire periphery of member 32. Channel member 32 is provided with a cover plate 37 which is secured to the flange 36 by welding or other suitable means. Cover 37 is provided with a pair of elongated depressions 38 each extending from approximately the center of member 37 towards its ends. Depressions 38 are provided for additional strength.

Within channel member 32 is secured an elongated A-shaped stamping 39 having its top abutting cover 37 and its legs secured to the bottom 33 of member 32. The A-shaped stamping 39 extends between the towers 15 and is provided to strengthen the cross member 11.

In the sides of member 39 are formed a series of spaced depressions 40 which make the member 39 more rigid. At spaced intervals between the depressions 40, member 39 is provided with a series of apertures 41.

On its underside at its center, cross member 11 is provided with a stamping 42 which is provided with a downwardly extending peripheral flange 44. Stamping 42 is riveted to the bottom 33 of channel member 32. Stamping 42 is provided with a flanged aperture 45 in which is positioned and rigidly secured a sleeve 46 which extends upwardly through a flanged aperture 47 which is formed in the bottom of the well 48 which is stamped downwardly in the cover member 37. Sleeve 46 is rigidly secured within these apertures by welding and a pair of bearings 49 are positioned within the sleeve.

Bolt 50 extends downwardly through the bearings 49 below cross member 11 and has journaled on its lower end the idler arm 52 of the steering mechanism of the wheels. The idler arm 52 has its inner end positioned within the flange 44 (Figure 4) of member 42 and is provided with a pair of ears 54. Idler arm 52 extends backwardly from bolt 50 through a cutout portion 56 of the member 42 to its rearmost end to which is rotatably secured the inner end of the manually controlled steering drag link 51 and the inner ends of steering tie rods 53. The outer ends of tie rods 53 are rotatably secured to steering arms 55 portions of which are rigidly secured between wheel pins 18 and spindles 19 of each wheel 10 in a substantially horizontal position by nuts 20 so that pins 18 may be rotated thereby. This steering mechanism is manually controlled through the arm 57 which is rotatably secured to the outer end of link 51 and is oscillated to pull and push link 51 by energy transmitted thereto through gears in housing 59 to which is secured the lower end of steering column 61 adjacent the upper end of which is positioned the usual hand steering wheel.

As idler arm 52 is rotated about the axis of bolt 50 by link 51 in either direction within cut out portion 56, this rotation will be limited by the ears 54 striking the ends 43 of the flange 44 of the member 42. In this manner a limitation on the amount the wheels of the vehicle may be turned is provided.

Shafts 58 are positioned within aligned apertures in walls 34 and 35 of cross member 11 and have threaded ends 60 (Figure 2) around which the inner ends of the lower control arms 12 are telescopically positioned. Washers 62 are positioned around each end of the shafts 58 and abut the adjacent walls 34 and 35 of cross member 11.

Internally threaded sleeve bolts 13 (Figure 2) are turned on the threaded ends 60 of the shafts 58 and are positioned within apertures formed in the lower control arms 12. Thus the bolts 13 form bearings between the control arms 12 and the shafts 58. Bolts 13 are provided with an outer enlarged portion 63 which abuts control arms 12 thereby holding the control arms in position on the bolts 13 and with grease fittings 14 to provide means for lubricating these connections.

Figures 2, 3:
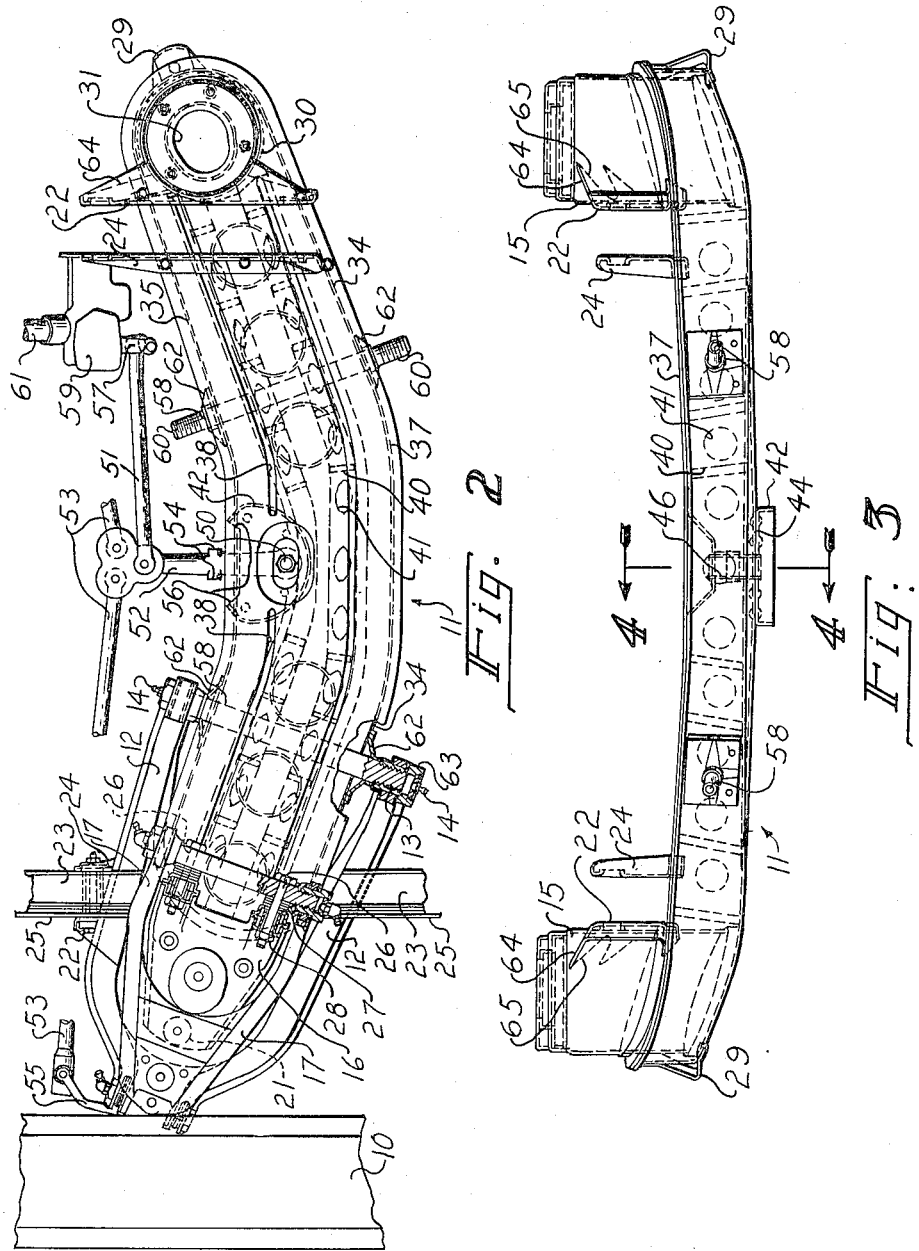
Figure 2 is a top plan view of the frame cross member of the invention to which is attached a portion of the steering mechanism and wheel carrying means of the invention.
Figure 3 is a front elevational view of the cross member shown in Figure 1.

Stampings 22, as shown in Figures 1, 2 and 3, are provided with outwardly turned portions 64 which have cut out portions 65 designed to fit the outer periphery of the towers 15. Stampings 22 are welded to the cover 37 of the cross member 11 and portions 65 of stampings 22 are welded to the towers 15. In this manner additional support is provided for said towers. Stampings 24 are also secured to cover 37 as by welding.

It will also be evident that various other forms, designs, embodiments, substitutions, eliminations, adaptations and combinations may be resorted to without departing from the broad spirit and scope of the invention as defined in the appended claims and hence we do not wish to limit ourselves in all respects to the exact and specific disclosures of the selected example of the invention herein illustrated and described.

What we claim is:

1. In an independent wheel suspension for a vehicle, a frame cross member comprising a flanged channel member having continuous walls extending around the ends thereof, a strengthening member rigidly secured within said channel member extending substantially along the length thereof, closure means rigidly secured to the flanged portions of said channel member, aligned apertures formed in said channel member and said closure member adjacent the ends thereof, cylindrical members rigidly secured within said aligned apertures and extending upwardly therefrom, and support means for said cylindrical members rigidly secured to said closure means and secured to said cylindrical means remote from said closure means.

2. In an independent wheel suspension for vehicles, a frame, a frame cross member comprising a flanged channel shaped member, an A-shaped strengthening member positioned within said channel member, a closure means for said channel member rigidly secured to the flanged portions thereof, aligned apertures in the ends of the channel member and closure member, cylindrical members rigidly secured within said aligned apertures and extending upwardly therefrom, support means for said cylindrical members rigidly secured to said closure means and said cylindrical members, and means for securing said cross members to said frame comprising support members secured to said closure means and spaced from said support means, and aligned apertures formed in said support means and said support members.

References Cited in the file of this patent

UNITED STATES PATENTS

| | | |
|---|---|---|
| 2,077,751 | Floss | Apr. 20, 1937 |
| 2,229,371 | Chayne | Jan. 21, 1941 |
| 2,246,824 | Wheat | June 24, 1941 |
| 2,344,378 | Wagner | Mar. 14, 1944 |